(12) United States Patent
Marupaduga (10) Patent No.: US 11,856,416 B2
(45) Date of Patent: Dec. 26, 2023

(54) DYNAMIC ANTENNA BEAM MANAGEMENT

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/828,256

(22) Filed: May 31, 2022

(65) Prior Publication Data
US 2022/0295306 A1    Sep. 15, 2022

Related U.S. Application Data (62) Division of application No. 17/118,200, filed on Dec. 10, 2020, now Pat. No. 11,356,863.

(51) Int. Cl.
*H04W 16/28* (2009.01)
*H04W 84/04* (2009.01)

(52) U.S. Cl.
CPC .......... *H04W 16/28* (2013.01); *H04W 84/042* (2013.01)

(58) Field of Classification Search
CPC ... H04W 16/28; H04W 84/042; H04B 7/0617
See application file for complete search history.

(56) References Cited

U.S. PATENT DOCUMENTS

| | | | |
|---|---|---|---|
| 10,841,914 B2 | 11/2020 | Liou et al. | |
| 11,005,194 B1* | 5/2021 | Frigon | ................ H01Q 25/001 |
| 2001/0003443 A1 | 6/2001 | Velazquez et al. | |
| 2013/0177102 A1 | 7/2013 | Park | |
| 2015/0045048 A1 | 2/2015 | Xu et al. | |
| 2016/0029225 A1* | 1/2016 | Hu | .......................... H04B 1/40 |
| | | | 455/562.1 |
| 2017/0208479 A1 | 7/2017 | Takeda et al. | |
| 2017/0215152 A1 | 7/2017 | Byun et al. | |
| 2018/0155958 A1 | 6/2018 | Li | |
| 2019/0044578 A1 | 2/2019 | Rao et al. | |
| 2019/0215700 A1 | 7/2019 | Sofuoglu | |
| 2020/0343945 A1 | 10/2020 | Stephenne et al. | |
| 2021/0235285 A1* | 7/2021 | Guerena | ............... H04W 16/28 |
| 2021/0314053 A1 | 10/2021 | Matsumura et al. | |
| 2021/0389474 A1* | 12/2021 | Hamzeh | ................. G01S 19/21 |

* cited by examiner

*Primary Examiner* — Kenneth T Lam
(74) *Attorney, Agent, or Firm* — SHOOK, HARDY & BACON L.L.P.

(57) ABSTRACT

Systems and methods are provided for dynamically modifying an antenna profile to increase network performance. Initially, at a first node communicating using a first wireless communication protocol, such as 4G, locations of a plurality of second nodes communicating using at least second wireless communication protocol, such as 5G, are determined. Performance criteria is analyzed of one of more of the plurality of second nodes. Based on the determined locations and the analyzed performance criteria, the antenna profile is dynamically adjusted to increase a width of a beam associated with the first node.

13 Claims, 9 Drawing Sheets

DYNAMIC ANTENNA BEAM MANAGEMENT

CROSS-REFERENCE TO RELATED APPLICATION

This application and entitled "Dynamic Antenna Beam Management" is a Divisional Application of U.S. Non-Provisional patent application Ser. No. 17/118,200, entitled "Dynamic Antenna Beam Management," filed Dec. 10, 2020. The entirety of the aforementioned application is incorporated by reference herein.

SUMMARY

The present disclosure is directed, in part, to dynamically adjusting an antenna profile to increase network performance, substantially as shown in and/or described in connection with at least one of the figures, and as set forth more completely in the claims.

According to various aspects of the technology, an antenna profile is dynamically adjusted to increase network performance, and also to increase the user experience. In one aspect, an antenna beam of a node associated with 4G (e.g., eNodeB) may be modified from a tapered beam to a full beam to include one or more nodes associated with 5G (e.g., gNodeB) in its coverage area. Have location information associated with the 5G nodes, a network component can determine whether the 4G node should be modified from a tapered beam to a full beam, which results in more 5G nodes being within the coverage area of the 4G node.

In another aspect, it is determined whether any user devices are located at the cell edge of a beam. Interference levels at nodes, including eNodeBs and gNodeBs, are monitored. 5G user devices that are located on the cell edge may experience lower or unacceptable RF conditions and low signal quality. When one of these user devices needs to send an acknowledgement request, this request may be sent at a higher power, which creates noise at the base station or node. If high interference is detected at a gNodeB where 5G technologies are used and the interference is caused by transmissions on the cell edge, a network component may modify a beam associated with 5G on the gNodeB from a full beam to a tapered beam, thus removing 5G coverage for the user devices determined to be on the cell edge.

In another aspect, when uplink split mode is used, when user devices utilizing 5G move into the coverage area of an eNodeB (4G), the performance of user devices that are communicating using 4G (e.g., not capable of utilizing 5G) is analyzed to determine whether their performance is being impacted because of the 4G frequencies needed by the 5G user devices. As a result, a network component may determine that a beam associated with 5G at the gNodeB is to be modified from a full beam to a tapered beam. Effectively, this removes the option of 5G from some of the user devices that are capable of using 5G and 4G.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, antennas may utilizing beamforming to produce beams used to provide service to user devices located in the area created by the beam. A beam shape/size can be modified. One way to modify the beam is to adjust the antenna profile from a tapered beam to a full beam (e.g., wider in width than a tapered beam) or from a full beam to a tapered beam. However, any type of modification is typically made based on conditions at the time the antenna is installed. Here, aspects are provided for dynamically modifying an antenna profile to improve network efficiencies and the user device experience.

A first aspect of the present disclosure is directed to a system for dynamically adjusting an antenna profile to increase network performance. The system includes a processor and one or more computer storage hardware devices storing computer-usable instructions that, when used by the processor, cause the processor to perform steps. These steps include, at a first node communicating using a first wireless communication protocol, determining locations of a plurality of second nodes communicating using at least second wireless communication protocol, and analyzing performance criteria of one of more of the plurality of second nodes. Further, these steps include, based on the determined locations and the analyzed performance criteria, dynamically adjusting the antenna profile to increase a width of a beam associated with the first node.

A second aspect of the present disclosure is directed to a method for dynamically adjusting an antenna profile to increase network performance. The method includes determining that one or more user devices capable of communicating using at least a first wireless communication protocol and operating using uplink split mode have connected to a sector, and monitoring performance of a plurality of other user devices connected to the sector, the plurality of other user devices communicating using a second wireless communication protocol. Further, the method includes upon determining that the performance of at least one user device of the plurality of other user devices is below a threshold, dynamically adjusting the antenna profile to narrow a beam associated with the first wireless communication protocol. As such, at least one of the one or more user devices capable of communicating using at least the first wireless communication protocol is unable to communicate using the first wireless communication protocol.

According to another aspect of the technology described herein, a method is provided for dynamically adjusting an antenna profile to increase network performance. The method includes determining that interference at a node associated with a first wireless communication protocol is above a threshold. Further, the method includes determining that a set of user devices served by the node is positioned at a cell edge, and at least one user device of the set of user devices positioned at the cell edge is experiencing poor performance. Also, the method includes upon determining that the performance of at least one of the plurality of user devices is below a threshold, dynamically adjusting the antenna profile to narrow a beam associated with the first wireless communication protocol. As such, at least one user device of the set of user devices is unable to communicate using the first wireless communication protocol.

Figure 1:
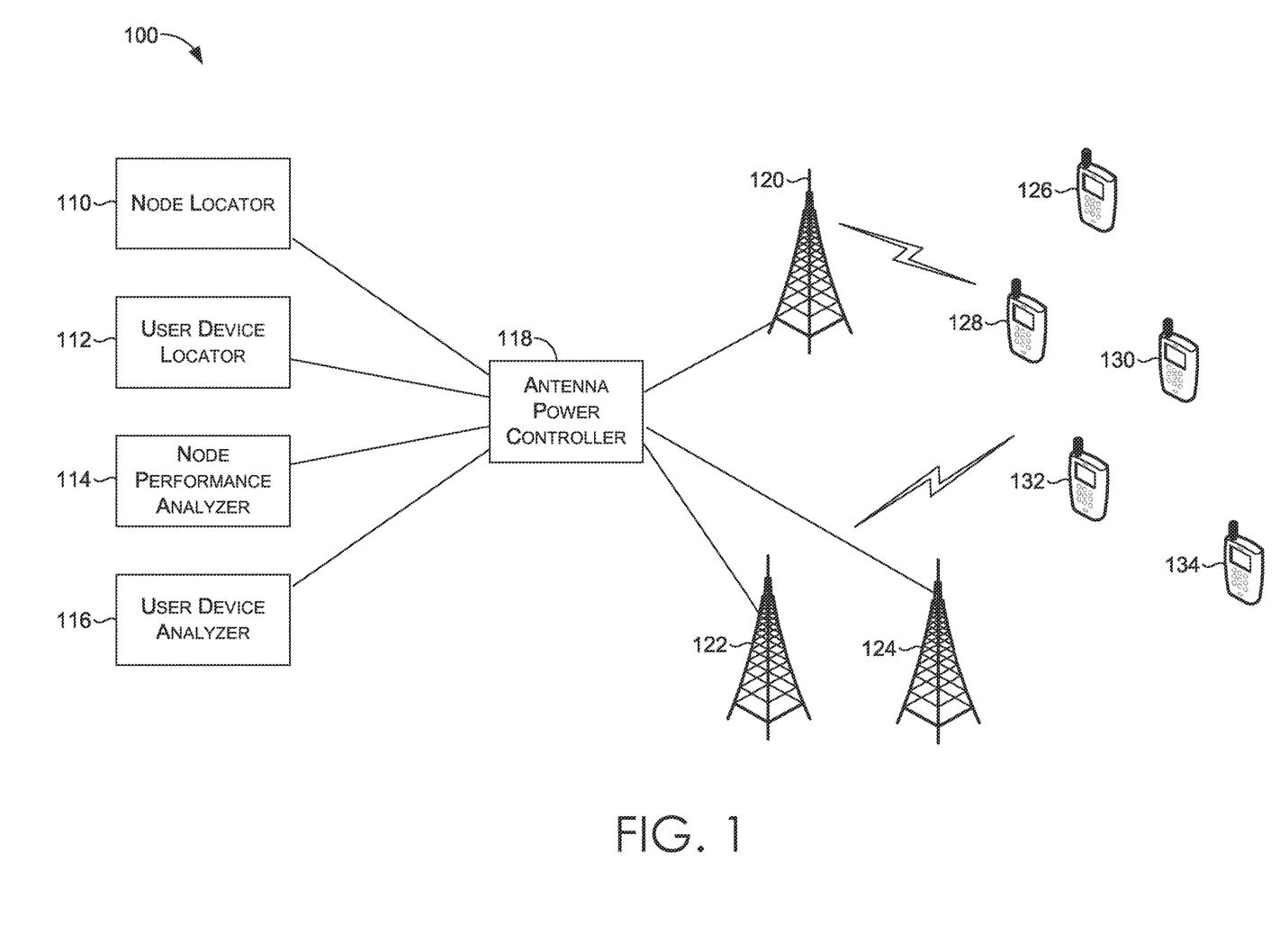
FIG. 1 depicts a diagram of an exemplary computing environment suitable for use in implementations of the present disclosure.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes node locator 110, user device locator 112, node performance analyzer 114, user device analyzer 116, antenna power controller 118, nodes 120, 122, and 124, and user devices 126, 128, 130, 132, and 134. In network environment 100, user devices 126, 128, 130, 132, and 134 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 900) that communicates via wireless communications with one or more of nodes 120, 122, or 124 in order to interact with a public or private network.

Figure 9:
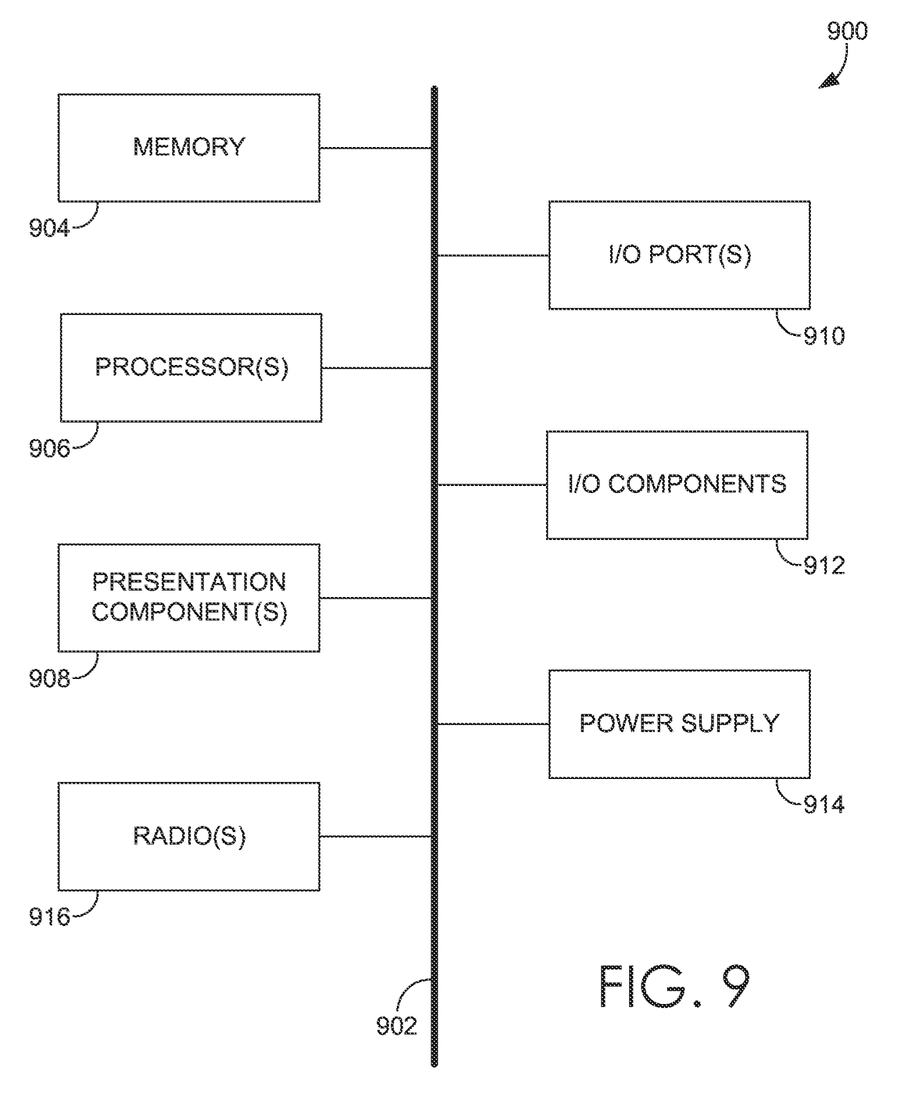
FIG. 9 depicts an exemplary computing environment suitable for use in implementations of the present disclosure.

In some aspects, the user devices 126, 128, 130, 132, and 134 may correspond to computing device 900 in FIG. 9. Thus, a user device can include, for example, a display(s), a power source(s) (e.g., a battery), a data store(s), a speaker(s), memory, a buffer(s), a radio(s) and the like. In some implementations, a user device (such as user devices 126, 128, 130, 132, and 134) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, user devices 126, 128, 130, 132, and 134 in network environment 100 can optionally utilize a network (not shown) to communicate with other computing devices (e.g., a mobile device(s), a server(s), a personal computer(s), etc.) through one or more of nodes 120, 122, or 124. The network may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

The network can be part of a telecommunication network that connects subscribers to their immediate service provider. In some instances, the network can be associated with a telecommunications provider that provides services (e.g., voice, data, SMS) to user devices, such as user devices 126, 128, 130, 132, and 134. For example, the network may provide voice and non-voice services, including SMS, and/ or data services to user devices or corresponding users that are registered or subscribed to utilize the services provided by a telecommunications provider. The network can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, nodes 120, 122, and 124 are configured to communicate with user devices, such as user devices 126, 128, 130, 132, and 134 that are located within the geographical area, or cell, covered by the one or more antennas of nodes 120, 122, and/or 124. Nodes 120, 122, and 124 may include one or more base stations, nodes, base transmitter stations, radios, antennas, antenna arrays, power amplifiers, transmitters/receivers, digital signal processors, control electronics, GPS equipment, and the like. In particular, user devices 126, 128, 130, 132, and 134 may communicate with nodes 120, 122, and 124, according to any one or more of a variety of communication protocols, in order to access the network.

In aspects, user devices 126, 128, 130, 132, and 134 may be capable of communicating using 4G (e.g., LTE) and 5G. In some aspects, user devices 126, 128, 130, 132, and 134 may be E-UTRAN New Radio-Dual Connectivity devices (ENDC). ENDC allows a user device to connect to an LTE eNodeB that acts as a master node and a 5G gNodeB that acts as a secondary node. As such, in these aspects, user devices 126, 128, 130, 132, and 134 may access both LTE and 5G simultaneously, and in some cases, on the same spectrum band. As shown in FIG. 1, user devices 126, 128, 130, 132, and 134 communicate by way of transmission with nodes 120, 122, and/or 124 using one or more of 4G (associated with node 120) and 5G (associated with node 122), sometimes simultaneously. Additionally, other wireless communication protocols may be utilized in conjunction with aspects described herein, as LTE and 5G are used for exemplary purposes only and not for limitation.

In aspects, nodes 120, 122, and/or 124 may work in conjunction with antenna power controller 118, in addition to node locator 110, user device locator 112, node performance analyzer 114, and user device analyzer 116. For example, in one aspect, an antenna beam of a node associated with 4G (e.g., eNodeB) may be modified from a tapered beam to a full beam to include one or more nodes associated with 5G (e.g., gNodeB) in its coverage area. Node locator 110 may be responsible for detecting the location of one or more nodes associated with 5G. With this location information, the antenna power controller 118 or some other network device can determine whether the node associated with 4G should be modified from a tapered beam to a full beam.

The user device locator 112 is responsible for determining whether any user devices are located at the cell edge, as further described below. The node performance analyzer 114 is responsible for monitoring interference levels at nodes, including eNodeBs and gNodeBs. 5G user devices that are located on the cell edge may experience lower or unacceptable RF conditions and low signal quality. When one of these user devices needs to send an acknowledgement request, this request may be sent at a higher power. When multiple user devices are transmitting a request at such a high power, noise is created at the base station or node. In these scenarios, the node performance analyzer 114 monitors interference at a node. If high interference is detected at a gNodeB where 5G technologies are used, the user device locator 112 determines whether any user devices are on the cell edge, and whether these user devices are transmitting at a high power on 5G. Here, the antenna power controller 118 or another network component may modify a beam associated with 5G on the gNodeB from a full beam to a tapered beam, thus removing 5G coverage for the user devices determined to be on the cell edge. Instead of disconnecting these user devices from the sector all together, the option of 5G is removed, thus leaving these user devices to communicate using 4G. This action results in a decrease of noise at the base station or node.

Figure 4:
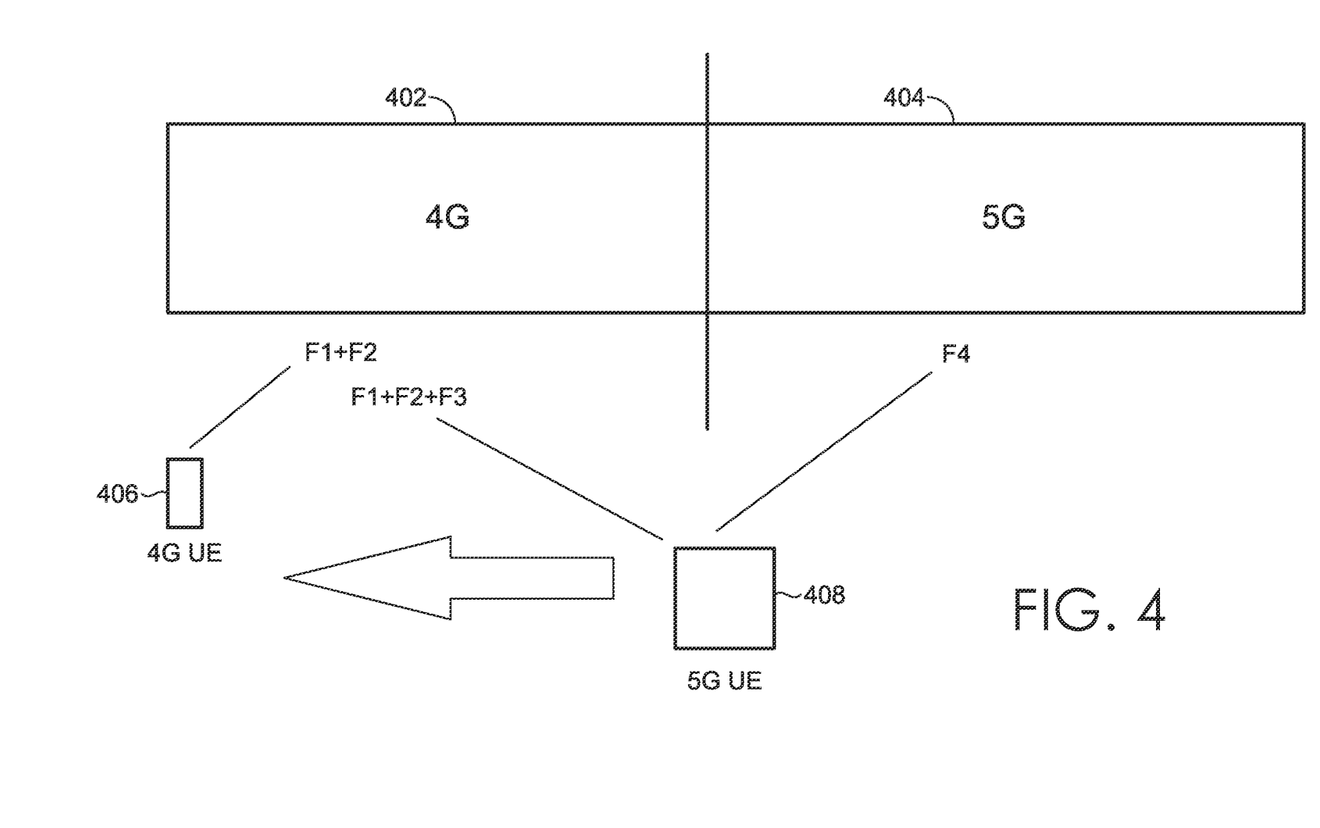
FIG. 4 depicts a diagram on frequency division between 4G and 5G, in accordance with aspects herein.

In regards to the user device analyzer 116, in some aspects, data may be received at a user device from both 4G and 5G nodes (e.g., eNodeBs and gNodeB). As used here, a 4G user device is a user device that is only capable of utilizing 4G (not 5G). To the contrary, a 5G user device is capable of using both 4G and 5G wireless communication technologies. In these split mode scenarios, when user devices utilizing 5G move into the coverage area of an eNodeB (4G), the performance of user devices that are communicating using 4G (e.g., not capable of utilizing 5G) is analyzed to determine whether their performance is being impacted. Because in split mode scenarios, the user devices utilizing 5G (dual mode UEs capable of communicating using both 4G and 5G) are also pulling 4G resources (data is being sent to the user devices on both 5G and 4G), the performance of user devices utilizing 4G may be impacted. As a result, the antenna power controller 118 or some other network component may determine that a beam associated with 5G at the gNodeB is to be modified from a full beam to a tapered beam. Effectively, this removes the option of 5G from some of the user devices that are capable of using 5G and 4G. By removing the option of 5G from some user devices, the load on 4G decreases, which will improve performance for the 4G user devices. FIG. 4, which will be described in full below, illustrates the frequencies utilized by a 4G user device in comparison to a 5G user device when split mode is being deployed.

Figure 2A:
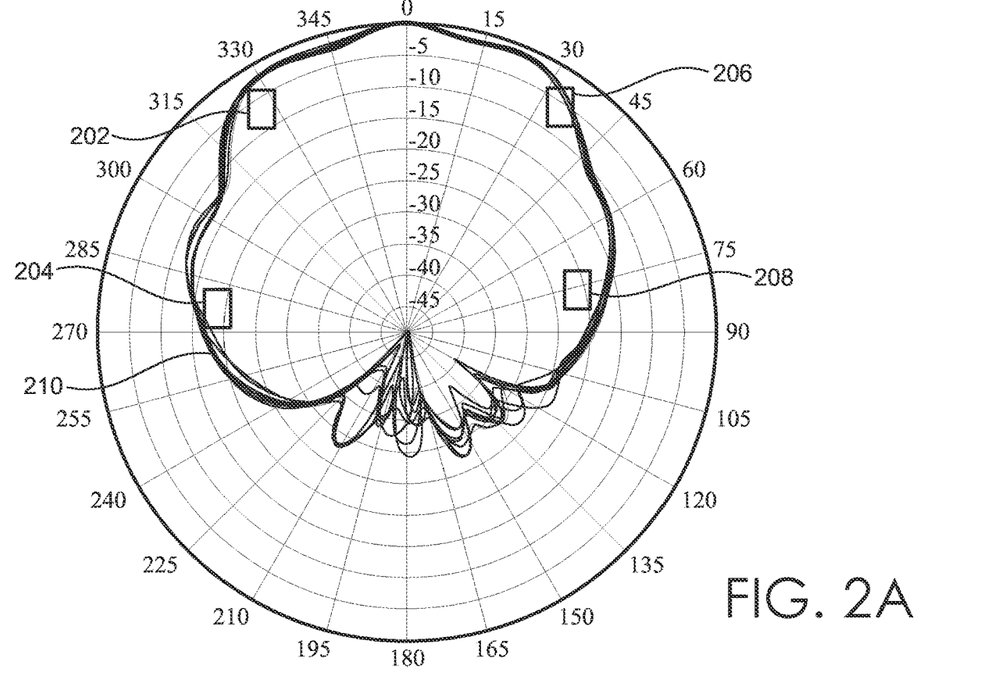
FIGS. 2A and 2B depict diagrams of antenna beam coverage in relation to multiple user devices, in accordance with aspects herein.
Figure 2B:
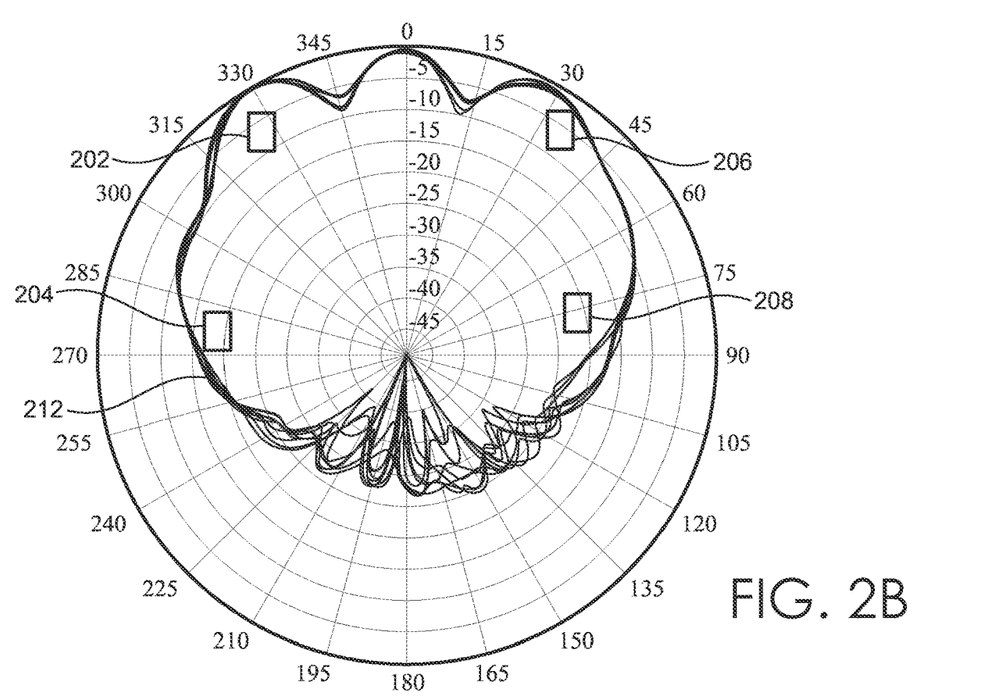

FIGS. 2A and 2B depict diagrams of antenna beam coverage in relation to multiple nodes. Specifically, FIG. 2A depicts a tapered beam, while FIG. 2B depicts a full beam. In FIG. 2A, nodes 202, 204, 206, and 208 are located on or near the edge of beam 210. In one aspect, nodes 202, 204, 206, and 208 are gNodeBs and communicate with user devices using 5G wireless communication technology. Beam 210 is formed by one or more antennas associated with, for instance, an eNodeB that utilizes 4G wireless communication technology. Because these nodes are on or near the edge of 4G beam 210, they may not all be able to utilize In aspects, one eNodeB (e.g., master node) may connect to multiple gNodeBs (e.g., secondary nodes), or even the other way around. When a gNodeB is connected to an eNodeB, the gNodeB is within the coverage area of the eNodeB. In FIG. 2A, one or more of the nodes 202, 204, 206, and 208 may not be well enough within the coverage area of beam 210. As such, a network component may make a determination that beam 210 is to be modified from a tapered beam, such as is shown in FIG. 2A, to a full beam, as shown in FIG. 2B. Nodes 202, 204, 206, and 208 in FIG. 2B are better positioned to establish a strong connection with the node associated with beam 212, as beam 212 is wider than beam 210 of FIG. 2A.

Figure 3A:
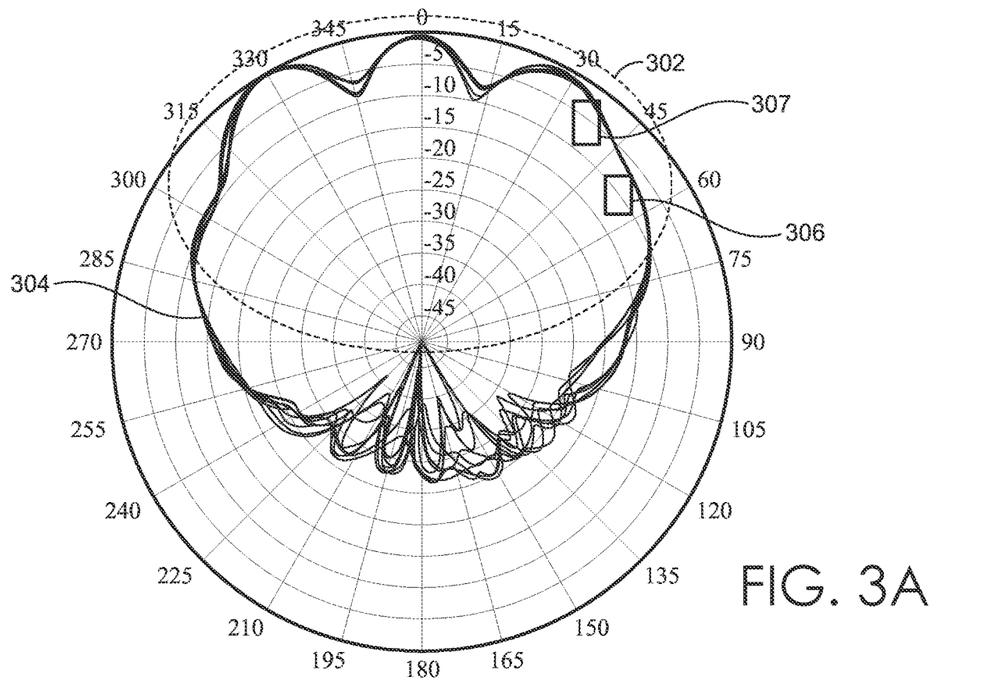
FIGS. 3A and 3B depict diagrams of antenna beam coverage in relation to multiple user devices, in accordance with aspects herein.

FIGS. 3A and 3B depict diagrams of antenna beam coverage in relation to multiple user devices. FIG. 3A illustrates full 5G beam 304 (e.g., a beam formed by one or more antennas associated with a node that utilizes 5G wireless communication technology), 4G beam 302 (a beam formed by one or more antennas associated with a node that utilizes 4G wireless communication technology), and user devices 306 and 307 that are within beam 304, and that are capable of communicating using at least 5G, and in some aspects, at least both 4G and 5G. In FIG. 3A, user devices 306 and 307 are within the coverage area of 5G beam 304, and also within the coverage area of 4G beam 302. In aspects, when 5G user devices 306 and 307 utilize uplink split mode ("UL split mode"), user devices that utilize 4G but not 5G (e.g., 4G user devices) may experience service or performance issues because of the 4G frequencies needed for the 5G user devices 306 and 307 that utilize UL split mode. As used herein, UL split mode refers to a user device, such as a 5G-capable user device, receiving data over both 4G and 5G links. Because the 5G user devices 306 and 307 require so many 4G frequencies when using UL split mode, the 4G user device performance may be negatively impacted.

Figure 3B:
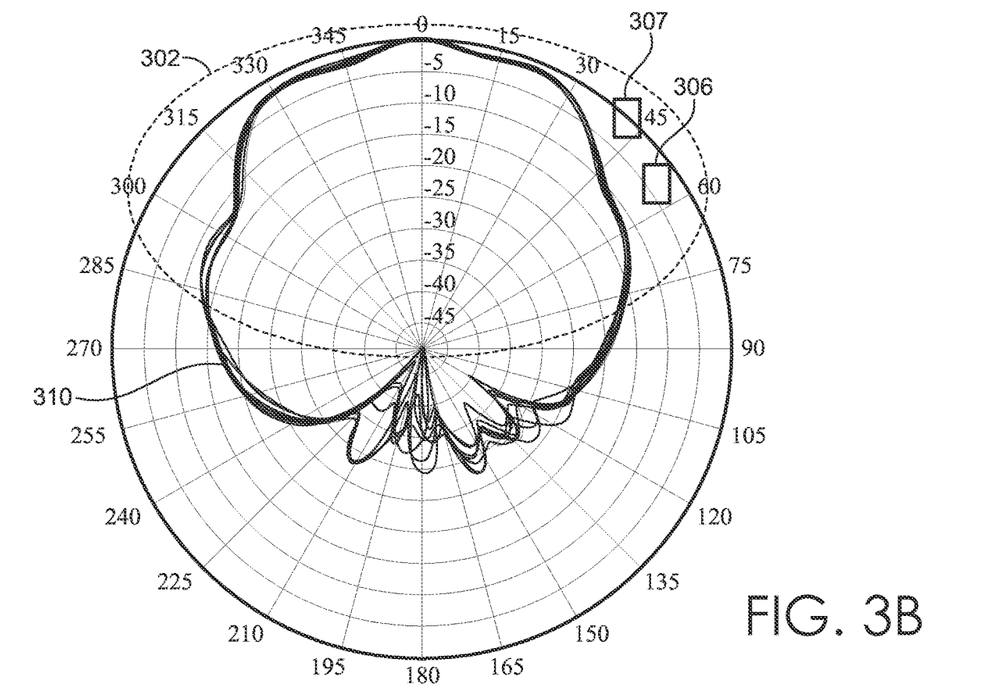

If the service/performance of one or more of the 4G user devices is negatively impacted, 5G beam 304 may be modified from a full beam to a tapered beam, thus removing one or more of the 5G user devices 306 and 307 from the 5G coverage area. As shown in FIG. 3B, 5G beam 310 is tapered, and the 5G user devices 306 and 307 are now outside the coverage area for the 5G beam 310, but still within the coverage area of 4G beam 302. This allows the 4G user devices to have improved service/performance by having access to more 4G frequencies, but still providing the 5G user devices 306 and 307 with 4G coverage.

FIG. 4 depicts a diagram on frequency division between 4G and 5G, in accordance with aspects herein. In FIG. 4, 4G wireless communication technology 402 and 5G wireless communication technology 5G 404 are illustrated. F1+F2 frequencies on 4G 402 are allocated to 4G user device 406. 4G user device 406 may not be capable of utilizing 5G 404, or may not be utilizing 5G 404 for some reason. 5G user device 408 is shown as utilizing UL split mode, thus receiving data from both 4G 402 and 5G 404. As mentioned, when UL split mode is utilized, the user device requires more frequencies and/or other resources from 4G 402 than if the user device was only on 4G 402, and not 5G 404. As such, here, 5G user device 408 requires F1+F2+F3 from 4G 402 and F4 from 5G 404. Of course, the allocation of frequencies shown in FIG. 4 is provided for exemplary purposes only and not limitation.

Figure 5A:
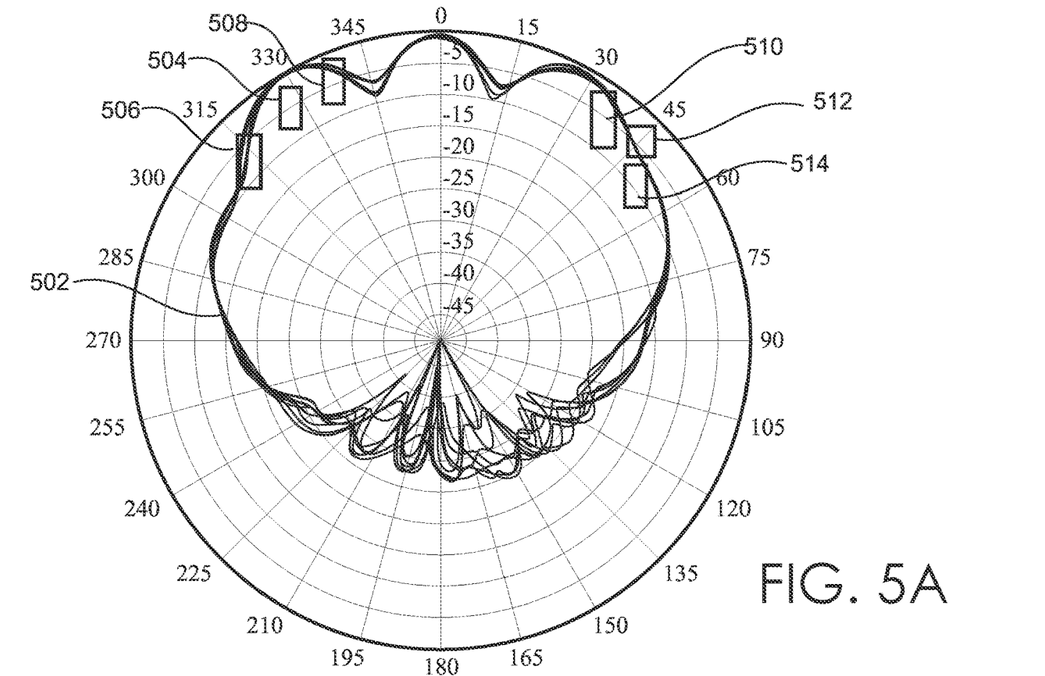
FIGS. 5A and 5B depict diagrams of antenna beam coverage in relation to multiple user devices, in accordance with aspects herein.
Figure 5B:
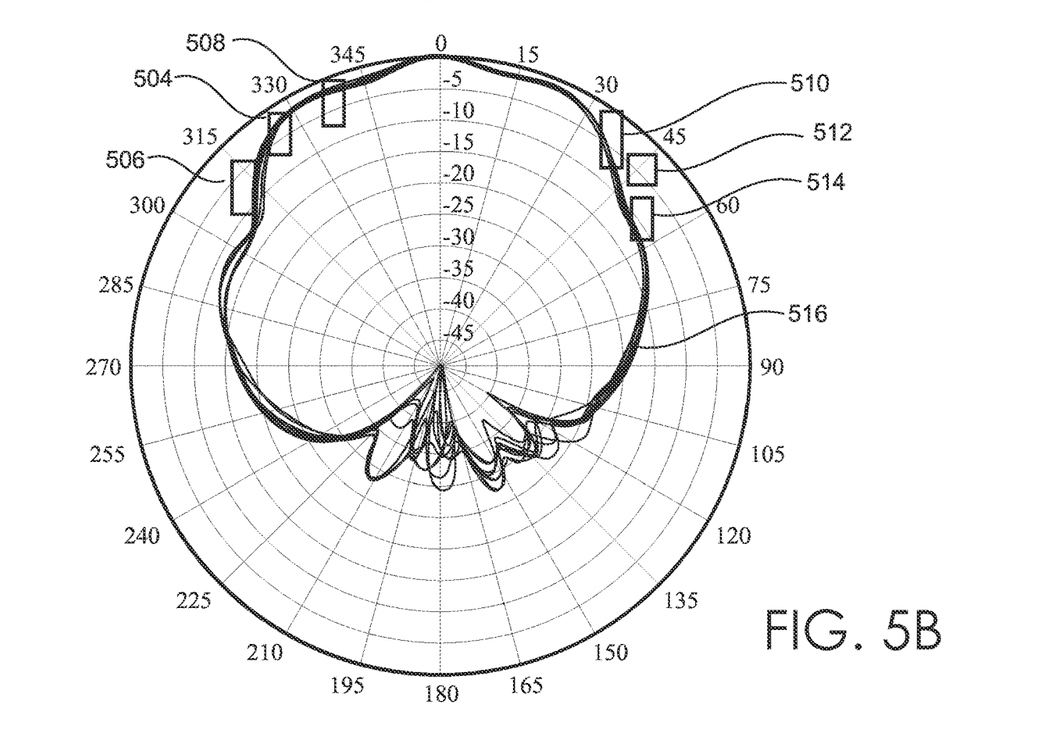

FIGS. 5A and 5B depict diagrams of antenna beam coverage in relation to multiple user devices, in accordance with aspects herein. In FIG. 5A, 5G user devices 504, 506, 508, 510, 512, and 514 are located on the cell edge, meaning they are at or near the edge of 5G beam 502. In instances such as this, these user devices may have to transmit at a higher power than they typically would if not located on the cell edge of 5G beam 502. These high transmissions cause a high level of noise at the node, or base station. The more user devices that are at the cell edge and transmitting at a high power, the higher the noise is. To remedy the noise issue, 5G beam 502 may be modified from a full beam, as shown in FIG. 5A, to a tapered beam (5G beam 516), as shown in FIG. 5B. 5G user devices 504, 506, 508, 510, 512, and 514 are illustrated as being outside of 5G beam 516. Thus, these devices would not be able to communicate using 5G, but instead could use 4G. This may provide benefits on both the network side (e.g., less noise at the base station/node) and the user device side (e.g., improved service/performance).

Figure 6:
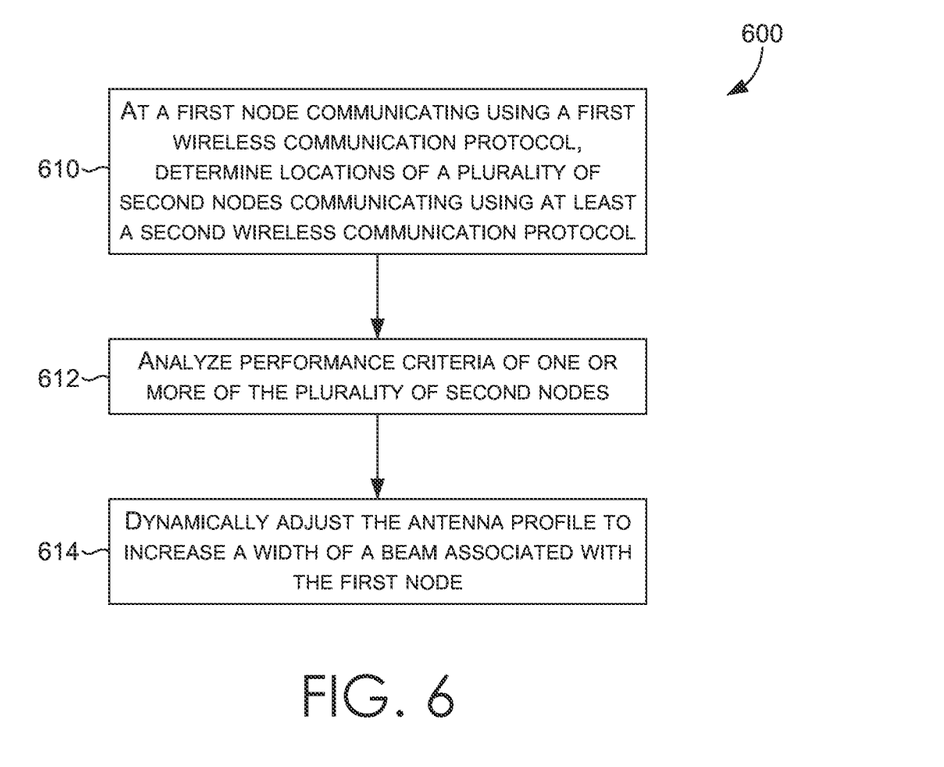
FIGS. 6-8 depict flow diagrams of exemplary methods for dynamically adjusting an antenna profile to increase network performance, in accordance with aspects herein.

FIG. 6 depicts a flow diagram of an exemplary method 600 for dynamically adjusting an antenna profile to increase network performance, in accordance with aspects herein. At block 610, at a first node communicating using a first wireless communication protocol, locations are determined of second nodes communicating using at least a second wireless communication protocol, e.g., 4G. In some aspects, the first node is a 4G node, such as an eNodeB, and thus the first wireless communication protocol is 4G. The second nodes, in aspects, are 5G nodes, or gNodeBs, that communicate using 5G. At block 612, performance criteria is analyzed of one or more second nodes. Performance criteria may include key performance indicators (KPI), 5G data statistics, data throughput, signal quality levels, and the like. At block 614, the antenna profile is dynamically adjusted to increase a width of a beam associated with the first node. Prior to modifying the beam width, the antenna profile is accessed to determine whether the beam is currently tapered or full. The decision to modify the antenna profile may be based on the determined locations of the second nodes, and the analyzed performance criteria. In aspects, at least one of the second nodes does not meet a threshold for performance criteria, and this may cause a decision to modify the antenna profile. Modifying the antenna profile to increase a beam width allows for more of the 5G nodes in a particular vicinity of a 4G node to be within the coverage area of a beam associated with the 4G node. This allows for more 5G nodes to be covered by the 4G node to allow for better 4G coverage of the 5G nodes, allowing for improved overall EN-DC performance. In embodiments, X2 links are used for nodes to communicate with one another (e.g., eNodeB to communicate with gNodeB), and also to make determinations as to the locations of various nodes.

Figure 7:
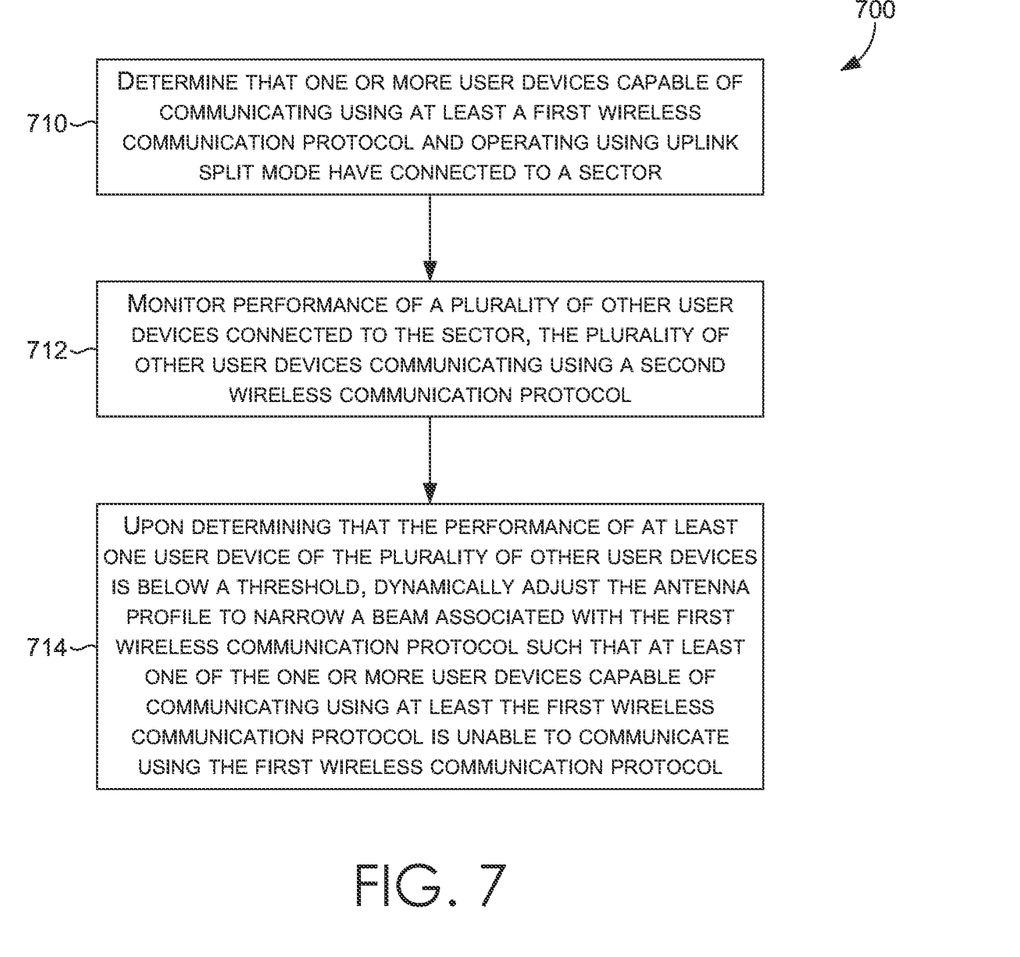

Turning now to FIG. 7, a flow diagram is depicted of an exemplary method 700 for dynamically adjusting an antenna profile to increase network performance, in accordance with aspects herein. At block 710, it is determined that one or more user devices capable of communicating using at least a first wireless communication protocol and operating using UL split mode have connected to a sector. In aspects, the first wireless communication protocol is 5G. At block 712, the performance is monitored of other user devices that are connected to the same sector. In aspects, the other user devices communicate using a second wireless communication protocol which, in aspects, is 4G. At block 714, upon determining that the performance of at least one user device of the other user devices is below a threshold, the antenna profile is dynamically adjusted to narrow a beam associated with the first wireless communication protocol. When the beam is narrowed (e.g., adjusted from a full beam to a tapered beam), the user devices that communicate using the first wireless communication protocol, but in some aspects are also able to communicate using the second wireless communication protocol, are now outside the coverage area of the beam associated with the first wireless communication protocol. This forces those user devices to communicate using the second wireless communication protocol (e.g., 4G). In some aspects, user devices that are utilizing 5G and 4G (e.g., UL split mode) require or utilize more frequencies from 4G than user devices utilizing 4G and not 5G. As such, narrowing the beam from full to tapered and removing some of the user devices off of 5G renders a service/performance improvement for the user devices removed from 5G, and also for the network.

Figure 8:
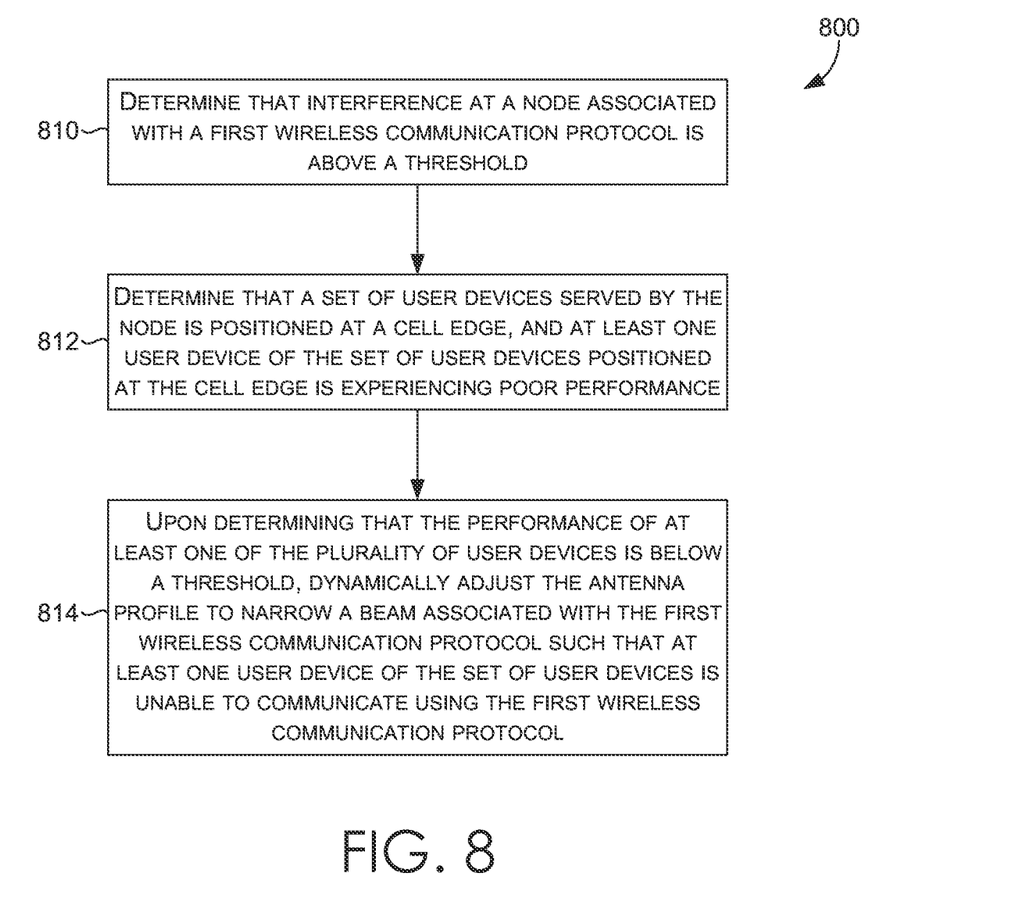

FIG. 8 depicts another flow diagram of an exemplary method 800 for dynamically adjusting an antenna profile to increase network performance, in accordance with aspects herein. At block 810, it is determined that interference at a node associated with a first wireless communication protocol is above a threshold. In aspects, the interference is caused by the user device at the cell edge transmitting at a power higher than a threshold. This may be caused by at least the location of the user device being at the cell edge. These high power transmissions can cause noise at the node. At block 812, it is determined that a set of user devices served by the node is positioned at a cell edge. Also, it is determined at block 812 that at least one user device of the set positioned at the cell edge is experiencing poor performance. At block 814, the antenna profile is dynamically adjusted to narrow a beam associated with the first wireless communication protocol such that at least one user device of the set is unable to communicate using the first wireless communication protocol. Instead, the at least one user device of the set is able to communicate using a second wireless communication protocol. In some aspects, the first wireless communication protocol is 5G (e.g., the node is a gNodeB) and the second wireless communication protocol is 4G (e.g., the node is an eNodeB).

Referring to FIG. 9, a diagram is depicted of an exemplary computing environment suitable for use in implementations of the present disclosure. In particular, the exemplary computer environment is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 9, computing device 900 includes bus 902 that directly or indirectly couples the following devices: memory 904, one or more processors 906, one or more presentation components 908, input/output (I/O) ports 910, I/O components 912, and power supply 914. Bus 902 represents what may be one or more busses (such as an address bus, data bus, or combination thereof). Although the devices of FIG. 9 are shown with lines for the sake of clarity, in reality, delineating various components is not so clear, and metaphorically, the lines would more accurately be grey and fuzzy. For example, one may consider a presentation component such as a display device to be one of I/O components 912. Also, processors, such as one or more processors 906, have memory. The present disclosure hereof recognizes that such is the nature of the art, and reiterates that FIG. 9 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 904 includes computer-storage media in the form of volatile and/or nonvolatile memory. Memory 904 may be removable, nonremovable, or a combination thereof. Exemplary memory includes solid-state memory, hard drives, optical-disc drives, etc. Computing device 900 includes one or more processors 906 that read data from various entities such as bus 902, memory 904 or I/O components 912. One or more presentation components 908 presents data indications to a person or other device. Exemplary one or more presentation components 908 include a display device, speaker, printing component, vibrating component, etc. I/O ports 910 allow computing device 900 to be logically coupled to other devices including I/O components 912, some of which may be built in computing device 900. Illustrative I/O components 912 include a microphone, joystick, game pad, satellite dish, scanner, printer, wireless device, etc.

Radio 916 represents a radio that facilitates communication with a wireless telecommunications network. Illustrative wireless telecommunications technologies include CDMA, GPRS, TDMA, GSM, and the like. Radio 916 might additionally or alternatively facilitate other types of wireless communications including Wi-Fi, WiMAX, LTE, or other VoIP communications. As can be appreciated, in various embodiments, radio 916 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for dynamically adjusting an antenna profile to increase network performance, the system comprising:
   a processor; and
   one or more computer storage hardware devices storing computer-usable instructions that, when used by the processor, cause the processor to:
   determine that interference at a node associated with a first wireless communication protocol is above a threshold;
   determine that,
   (1) a set of user devices served by the node is positioned at a cell edge, and
   (2) at least one user device of the set of user devices positioned at the cell edge is experiencing poor performance; and
   upon determining that the performance of at least one of the plurality of user devices is below a threshold, dynamically adjust the antenna profile to narrow a beam associated with the first wireless communication protocol such that at least one user device of the set of user devices is unable to communicate using the first wireless communication protocol.

2. The system of claim 1, further comprising determining that at least one of the plurality of user devices capable of communicating using at least the first wireless communication protocol and operating using uplink split mode are connected to a sector, monitoring performance of a plurality of other user devices connected to the sector, the plurality of other user devices communicating using a second wireless communication protocol, and upon determining that at least one user device of the plurality of other user devices is below a threshold, dynamically adjusting the antenna profile to narrow a beam associated with the first wireless communication protocol such that at least one of the plurality of user devices capable of communicating using at least the first wireless communication protocol is unable to communicate using the first wireless communication protocol.

3. The system of claim 1, wherein the interference is caused by the at least one user device of the set of user devices at the cell edge transmitting at a power higher than a threshold.

4. The system of claim 3, wherein the transmitting at the power higher than the threshold causes noise at the node.

5. The system of claim 1, wherein the first wireless communication protocol is 5G.

6. The system of claim 1, wherein the at least one user device of the set of user devices that is unable to communicate using the first wireless communication protocol is able to communicate using a second wireless communication protocol.

7. The system of claim 6, wherein the second wireless communication protocol is 4G.

8. The system of claim 1, wherein narrowing the beam associated with the first wireless communication protocol adjusts the beam from a full beam to a tapered beam.

9. A method for dynamically adjusting an antenna profile to increase network performance, the method comprising:
   determining that interference at a node associated with a first wireless communication protocol is above a threshold;
   determining that,
   (1) a set of user devices served by the node is positioned at a cell edge, and
   (2) at least one user device of the set of user devices positioned at the cell edge is experiencing poor performance; and
   upon determining that the performance of at least one of the plurality of user devices is below a threshold, dynamically adjusting the antenna profile to narrow a beam associated with the first wireless communication protocol such that at least one user device of the set of user devices is unable to communicate using the first wireless communication protocol.

10. The method of claim 9, wherein the interference is caused by the at least one user device of the set of user devices at the cell edge transmitting at a power higher than a threshold.

11. The method of claim 10, wherein the transmitting at the power higher than the threshold causes noise at the node.

12. The method of claim 9, wherein the first wireless communication protocol is 5G.

13. The method of claim 9, wherein the at least one user device of the set of user devices that is unable to communicate using the first wireless communication protocol is able to communicate using a second wireless communication protocol.

* * * * *